US009620992B2

United States Patent
Givelin et al.

(10) Patent No.: US 9,620,992 B2
(45) Date of Patent: Apr. 11, 2017

(54) POWER SAFETY CIRCUIT, INTEGRATED CIRCUIT DEVICE AND SAFETY CRITICAL SYSTEM

(75) Inventors: Philippe Givelin, Leguevin (FR); Valerie Bernon-Enjalbert, Fonsorbes (FR); Guillaume Founaud, Saint Orens de Gameville (FR)

(73) Assignee: NXP USA, Inc., Austin, TX (US)

( * ) Notice: Subject to any disclaimer, the term of this patent is extended or adjusted under 35 U.S.C. 154(b) by 304 days.

(21) Appl. No.: 14/354,278

(22) PCT Filed: Oct. 27, 2011

(86) PCT No.: PCT/IB2011/003298
§ 371 (c)(1),
(2), (4) Date: Apr. 25, 2014

(87) PCT Pub. No.: WO2013/061110
PCT Pub. Date: May 2, 2013

(65) Prior Publication Data
US 2014/0300193 A1 Oct. 9, 2014

(51) Int. Cl.
*H02J 7/00* (2006.01)
*H02J 9/06* (2006.01)
*B60R 21/017* (2006.01)
*B60T 8/88* (2006.01)

(52) U.S. Cl.
CPC .......... *H02J 9/061* (2013.01); *B60R 21/0173* (2013.01); *B60T 8/885* (2013.01); *B60T 2270/414* (2013.01); *Y10T 307/615* (2015.04)

(58) Field of Classification Search
CPC ............................ H02J 9/061; Y10T 307/615

USPC .................................................. 307/64–66
See application file for complete search history.

(56) References Cited

U.S. PATENT DOCUMENTS

| 5,745,670 A | 4/1998 | Linde |
| 5,886,561 A * | 3/1999 | Eitan ...................... H02J 9/061 307/64 |
| 7,750,496 B2 * | 7/2010 | Cottingham, III ........ H02J 9/06 307/66 |

(Continued)

FOREIGN PATENT DOCUMENTS

EP 0843398 A2 5/1998

OTHER PUBLICATIONS

International Search Report and Written Opinion correlating to PCT/IB2011/003298 dated Apr. 18, 2012.

*Primary Examiner* — Jared Fureman
*Assistant Examiner* — Alfonso Perez Borroto
(74) *Attorney, Agent, or Firm* — Charlene R. Jacobsen

(57) ABSTRACT

A power safety circuit comprises a power sense terminal; an output terminal; an output driver unit connected to the output terminal; an input terminal connectable to receive a first power from a power source and arranged to supply the first power to the output driver unit; and a power detection unit arranged to detect a state of the input terminal and provide a power sense signal to the power sense terminal; wherein the power sense terminal is arranged to supply a second power to the output driver unit when the power sense signal indicates a level of the first power below a minimum level for driving the output terminal. An integrated circuit device comprises at least one power safety circuit. A safety critical system comprises at least one integrated circuit device with at least one power safety circuit.

19 Claims, 2 Drawing Sheets

(56) References Cited

U.S. PATENT DOCUMENTS

| | | |
|---|---|---|
| 7,800,433 B2 | 9/2010 | Yoshikawa et al. |
| 8,710,698 B2 * | 4/2014 | Price .................. G06F 1/263 |
| | | 307/11 |
| 8,751,846 B2 | 6/2014 | Yu et al. |
| 2003/0193363 A1 | 10/2003 | Egan |
| 2004/189096 A1 * | 9/2004 | Bolz .................. H02M 1/088 |
| | | 307/64 |
| 2006/0091864 A1 * | 5/2006 | Watanabe ............ H02P 9/305 |
| | | 322/28 |
| 2009/0082910 A1 * | 3/2009 | Sato .................. G06F 1/263 |
| | | 700/297 |
| 2009/0184582 A1 | 7/2009 | Hwang |
| 2010/0141040 A1 * | 6/2010 | Chapel ............. H01R 13/6683 |
| | | 307/80 |
| 2010/0148805 A1 * | 6/2010 | Imhoff .................. B61L 1/20 |
| | | 324/678 |
| 2010/0264743 A1 * | 10/2010 | Jung .................. H02J 9/061 |
| | | 307/80 |

* cited by examiner

US 9,620,992 B2

POWER SAFETY CIRCUIT, INTEGRATED CIRCUIT DEVICE AND SAFETY CRITICAL SYSTEM

FIELD OF THE INVENTION

This invention relates to a power safety circuit, an integrated circuit device and safety critical system.

BACKGROUND OF THE INVENTION

Electronic devices usually require a certain available amount of power for functioning correctly. Some systems, for example, safety critical systems, such as for example vehicles, or systems therein, for example automotive safety critical systems, such as car braking systems, may not be fault tolerant and may employ fault tolerant or fail-safe circuits or devices, which, in an event of failure, respond such that only a minimum or no harm is caused to the system, the environment and users of the system.

In order to specify functional safety, for example for automotive applications, standards are defined by standardization organizations, such as the IEC 61508 standard by the International Electrotechnical Commission (IEC) or the ISO 26262 functional safety standard by the International Organization for Standardization. For example, for safety applications targeting Automotive Safety Integrity Level D (ASIL-D), i.e., the highest level of functional safety defined in ISO 26262, the safety functions must be ensured even in case of a power supply loss. In an integrated circuit (IC), power supply loss may, for example, be caused by a pin lift or a bonding disconnection.

As shown in FIG. 1, a prior art power safety circuit 10 may provide a solution for increased fault tolerance by means of power supply redundancy. The shown prior art circuit protects a fail safe output terminal 12 driven by an output terminal driver circuit 14 in a fail safe machine 16, wherein the output terminal driver circuit 14 is supplied with power from a first and a second power source 18, 20 at the same time through two redundant power supply terminals 22, 24, both connected to supply the output terminal driver circuit 14 with power. For example, in U.S. Pat. No. 5,745,670, fault tolerance of an electronic system against power supply loss is achieved by providing power from two power sources via two redundant power supply connections to a local power supply and a power distribution bus.

SUMMARY OF THE INVENTION

The present invention provides a power safety circuit, an integrated circuit (IC) device and safety critical system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary, as illustrated, for the understanding and appreciation of the underlying concepts of the present invention and in order not to obfuscate or distract from the teachings of the present invention.

Figure 1:
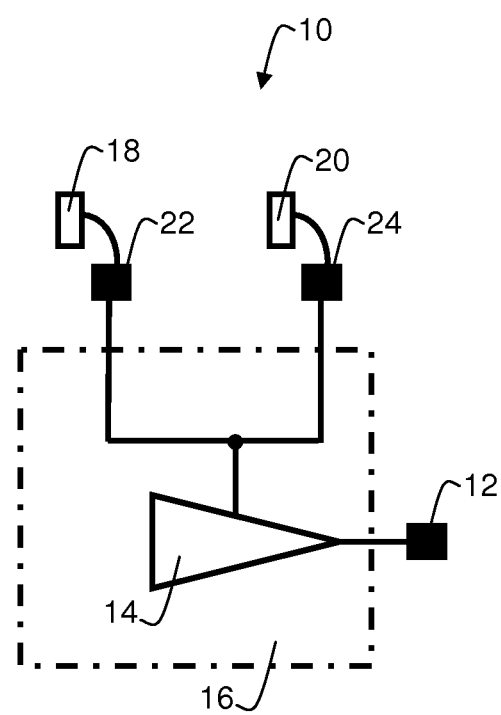
FIG. 1 schematically shows a prior art power safety circuit.
Figure 2:
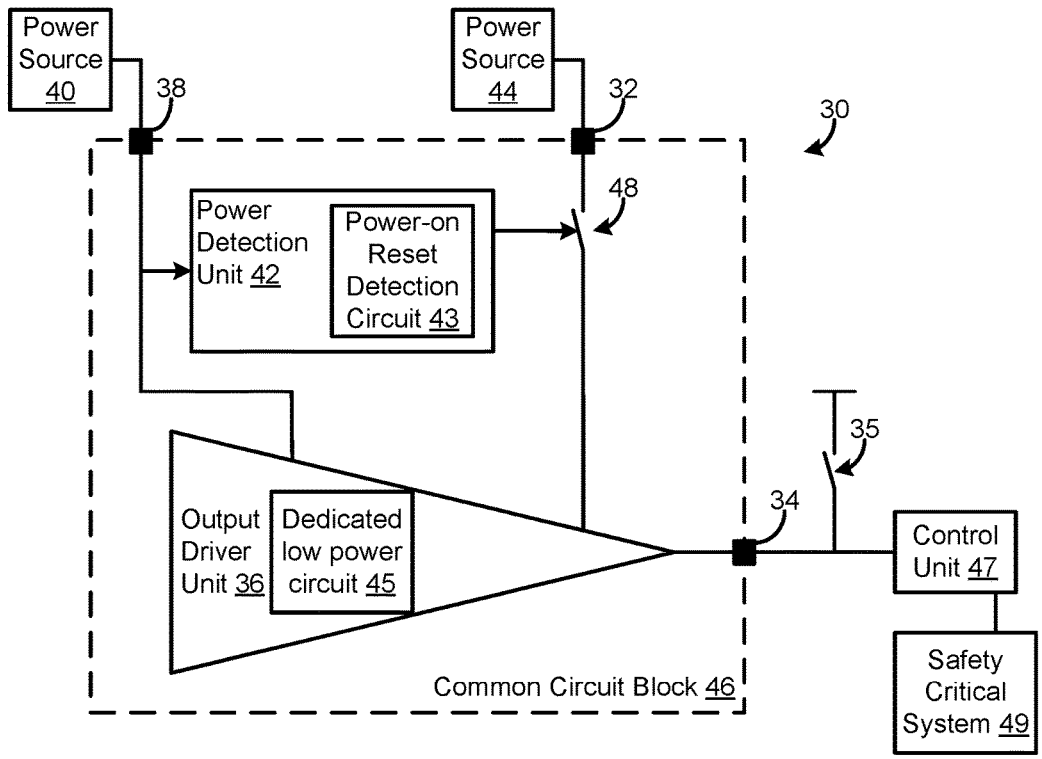
FIG. 2 schematically shows an example of an embodiment of a power safety circuit.

Referring to FIG. 2, an example of an embodiment of a power safety circuit 30 is schematically shown. The power safety circuit 30 comprises a power sense terminal 32, an output terminal 34, an output driver unit 36 connected to the output terminal 34 that is connected to a high-side switch 35, an input terminal 38 connectable to receive a first power from a power source 40 and arranged to supply the first power to the output driver unit 36, and a power detection unit 42 arranged to detect a state of the input terminal 38 and provide a power sense signal to the power sense terminal 32; wherein the power sense terminal 32 is arranged to supply a second power to the output driver unit 36 when the power sense signal indicates a level of the first power below a minimum level for driving the output terminal 34. This may, for example, allow to re-use or multi-use a power sense terminal 32 dedicated to power sensing for supplying power to the output driver circuit 36 as a "sense and supply" terminal. Commonly, a power sense terminal is used for transferring monitoring information about a power supply to a processing device, for example about a voltage level at a power source, such as a battery. The power sense terminal 32 may, for example, be connected to another power source 44, which may, for example, be a low power source, for keeping the power sense terminal 32 at a certain voltage level of operation. In an embodiment, the second or other power source 44 may be the same power source 40. Multi-usage of a power sense terminal 32 may, for example, avoid a need for an additional input terminal 38 for redundant power supply connection. This may, for example reduce costs, e.g. by avoiding an additional pin and an increased used die area, when implementing the power safety circuit 30 in an integrated circuit device.

It should be noted that an output terminal 34 may refer to at least one output terminal, i.e., the output driver unit 36 may be arranged to drive one or a plurality of output terminals 34.

In an integrated circuit device, for example, a terminal may correspond to a pin of the integrated circuit device. A power source may, for example, be a current source or voltage source, such as a battery, for example a car battery.

A signal may be a time varying physical quantity carrying information, e.g. a varying voltage level. The power sense signal may carry information about the state of the input terminal 38, for example, about the power received at the input terminal 38, for example corresponding to a voltage level measured at the input terminal or an information whether the voltage level is below or above a voltage threshold corresponding to the minimum level of first power in order to decide whether or not enough power can be supplied to the output driver unit 36 for driving the output terminal 34. The power sense signal may, for example, be provided to an evaluation unit, for example of an integrated circuit device comprising the power safety circuit 30. The integrated circuit device may, for example, be a processing device.

The output driver circuit 36 and the power detection unit 42 may, for example, be comprised in a common circuit block or machine 46.

The power sense signal may be generated by the power detection unit 42 connected to sense and detect the state of the input terminal 38. It may provide the power sense signal corresponding directly to the measured state of the input terminal 38, e.g. a measured voltage level or current level, or may evaluate the state and provide filtered information, e.g. about presence or absence of the first power supply, as the power sense signal.

The minimum level of the first power may, for example, correspond to an absence of the first power, i.e. no first power may be received via input terminal 38. This may be due to, for example, a disconnection with the power source 40. In an integrated circuit device, this may, for example, be caused by pin lift or bonding disconnection from the device package. A power detection unit 42 arranged to only detect whether there is any power received at the input terminal 38 may be a circuit easy to implement.

The term first power may refer to a main power supplied to the power safety circuit 30, whereas second power may refer to "substitute" power drawn from the power sense terminal 32. Since a power sense terminal 32 may often receive power through a high impedance connection, only few current may be drawn from the power sense terminal 32, and a level of the second power may be low.

The output terminal 34 may be a fail safe terminal, i.e., a terminal that in an event of failure may cause only minimum or no harm and avoid destruction of the system, apparatus or device using the fail safe output terminal. Fail safety may be especially relevant for safety relevant applications, where malfunction may endanger a human user, for example, a car driver.

The output driver unit 36 may be arranged to drive the output terminal 34 in a fail safe state. Driving the output terminal 34 in a fail safe state may, for example, comprise pulling down a reset pin of an IC to ground voltage and activating the pin in a safe mode. A fail safe state may, for example, allow a graceful shutdown or power-on reset of an IC using the power safety circuit 30 for protecting its fail safe pins. The output driver unit 36 may be arranged to drive the output terminal in a fail safe state when receiving the second power. In other words, the power safety circuit 30 may be arranged to provide a level of the second power sufficiently high, i.e., above a minimum power threshold for driving into fail safe state, to allow the output driver unit 36 to drive the output terminal 34 in the fail safe state. Instead of a level of power a voltage level or current level may be considered. Driving the output terminal 34 in a fail safe state may refer to driving the output terminal into the fail safe state, as well as in, i.e. during, the fail safe state.

The power detection unit 42 may comprise a power-on reset detection circuit 43. A power-on reset detection circuit 43 may be a part of a power-on reset circuit incorporated in an integrated circuit, being arranged to detect the power applied to the integrated circuit and to generate a reset signal for bringing the IC into a known state. A power-on reset circuit may, for example, be available within the integrated circuit. Using a power-on reset circuit for power supply loss detection by the power detection unit 42 of the power safety circuit 30 may allow to reduce additional circuitry and costs when implementing the power safety circuit 30 into an available integrated circuit design.

The output driver unit 36 may comprise an output driver circuit arranged to drive the output terminal 34 when receiving the first power, and being modified to drive the output terminal 34 also when receiving the second power; or the output driver unit 36 may comprise a dedicated low power circuit 45 arranged to drive the output terminal 34 when receiving the second power from the power sense terminal 32. Instead of modifying an existing output driver circuit arranged to drive the output terminal 34 when receiving the first power, an additional dedicated low power circuit 45 may be provided that may be adapted to drive the output terminal 34, for example, in a selected mode or state, such as a fail safe state, which may not require supply of the same level of power as during normal operation mode.

A level of the second power may, for example, be lower than the level of the first power. The output driver unit 36 may be arranged to drive the output terminal 34 using the second power received from the power sense terminal 32, when the level of the first power at the input terminal 38 is detected to be below a minimum level for driving the output terminal 34, for example, even in case the detected level of the first power may still be higher than a level of the second power. Since a reduced first power level may be an indication of a malfunction of the circuit or the power source 40, it may be useful, for example, to enter a fail safe state in the most secure way and not rely on the malfunctioning, although not yet lost, first power supply.

The power detection unit 42 may be arranged to control a provision of the second power by the power sense terminal 32, i.e., the power detection unit 42 may be arranged to control a connection between the power sense terminal 32 and the output driver unit 36.

The power safety circuit 30 may comprise a switching unit 48 arranged to connect the power sense terminal 32 to the output driver unit 36 depending on the power sense signal. The power sense signal may be used by the power detection unit 42 to control the switching unit 48, or the power detection unit 42 may be arranged to generate a dedicated switch control signal from the power sense signal for controlling the switching unit 48.

In an embodiment, the power safety circuit 30 may be arranged to provide the power sense signal from the power detection unit 42 to the power sense signal also during connection of the power sense terminal 32 to the output driver unit 36. This may allow to evaluate the state of the input terminal 38 outside of the power detection unit 42 of the power safety circuit 30 at any time, even after switching to the second power provided by the power sense terminal 32.

The output terminal 34 may, for example, be connected to a control unit 47 arranged to switch a safety critical system 49 into a safety mode depending on the state of the input terminal 38. For example, a control unit 47 may be a switching circuit, e.g., arranged to switch on and off a connection between a safety critical system 49 and a power source. Just to give an example, a safety critical system 49 may, for example, be an anti-lock braking system (ABS) of a car and the power source may be a car battery.

As another example, the output terminal 34 may be a reset pin, for example of an integrated circuit device comprising the power safety circuit 30.

Figure 3:
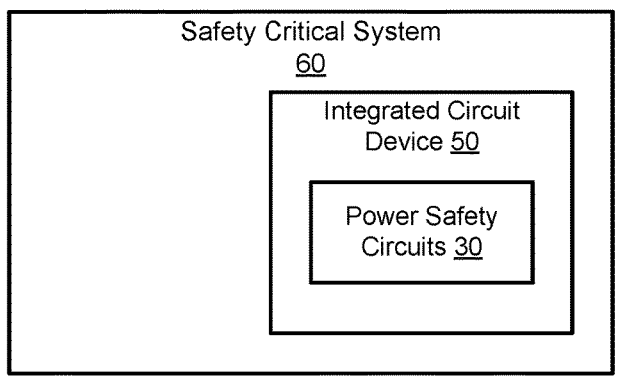
FIG. 3 schematically shows an example of an embodiment of a safety critical system comprising an integrated circuit device with a power safety circuit.

Referring to FIG. 3, an example of an embodiment of a safety critical system 60 comprising an integrated circuit device 50 with a power safety circuit 30 is schematically shown. The integrated circuit device 50 may comprise at least one power safety circuit 30 as described above. An integrated circuit device 50 may, for example, be a processing device, such as a microprocessor, a general purpose processor (GPP), a microcontroller unit (MCU), a multimedia processor, a graphics processing unit (GPU), or a digital signal processor (DSP), just to name a few.

As shown, a safety critical system 60 may comprise at least one power safety circuit 30 or at least one integrated circuit device 50 as described above.

A safety critical system 60 may, for example, be part of electronic equipment of a power plant or a vehicle. A vehicle may for example be a car, a truck, a plane, a ship, a helicopter, etc. A safety critical system of a vehicle, i.e., an automotive safety critical system, may, for example, comprise an engine control unit (ECU). An ECU is an electronic control unit which controls various aspects of an internal combustion engine's operation. Safety critical systems may also be found in non-automotive environments.

An automotive safety critical system may, also for example, be a car safety system. A safety critical system 60 may comprise a seat position control system, lighting, airbags, windscreen wipers, immobilizers, electronic climate control, a brake system or an electrical steering system. A brake system may comprise, for example, an anti-lock braking system (ABS), an electronic brakeforce distribution system (EBD), a cornering brake control (CBC) system etc. An electrical steering system may comprise, for example, an electronic stability control system (ESC), a traction control system (TCS) or anti-slip regulation system (ASR), an adaptive cruise control (ACC) system, a forward collision warning (FCW) system etc.

The safety critical system 60 shown in FIG. 3 may be in compliance with ISO 26262 functional safety standard. For example, the safety critical system 60 may comply with Automotive Safety Integrity Level D (ASIL-D), i.e., the highest level of functional safety defined in ISO 26262. This may refer to the complete safety critical system 60 or at least to the one or more power safety circuits 30 comprised in the safety critical system 60.

In the foregoing specification, the invention has been described with reference to specific examples of embodiments of the invention. It will, however, be evident that various modifications and changes may be made therein without departing from the broader spirit and scope of the invention as set forth in the appended claims.

For example, the semiconductor substrate described herein can be any semiconductor material or combinations of materials, such as gallium arsenide, silicon germanium, silicon-on-insulator (SOI), silicon, monocrystalline silicon, the like, and combinations of the above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the power detection unit 42 and the output driver unit 36 may be provided as a combined unit.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the integrated circuit device 50 may comprise at least one power safety circuit 30. Alternatively, the example may be implemented as any number of separate integrated circuits or separate devices interconnected with each other in a suitable manner. For example, the integrated circuit device 50 may be provided as a separate integrated circuit connected to another integrated circuit having one or more power safety circuits 30.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or an limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only of way of example and not as a limitation on the scope of the invention.

The invention claimed is:

1. A power safety circuit, comprising
a power sense terminal;
an output terminal;
an output driver unit connected to said output terminal;
an input terminal connectable to receive a first power from a power source and arranged to supply said first power to said output driver unit; and
a power detection unit arranged to detect a state of said input terminal and provide a power sense signal to said power sense terminal, wherein said power sense terminal is arranged to supply a second power to said output driver unit when said power sense signal indicates that a level of said first power is below a minimum level for driving said output terminal, and wherein a level of said second power is lower than said level of said first power.

2. The power safety circuit as claimed in claim 1, wherein said level of said first power being below said minimum level corresponds to an absence of said first power.

3. The power safety circuit as claimed in claim 1, wherein said output terminal is a fail safe terminal.

4. The power safety circuit as claimed in claim 1, wherein said output driver unit is arranged to drive said output terminal in a fail safe state when receiving said second power.

5. The power safety circuit as claimed in claim 1, wherein said power detection unit comprises a power-on reset detection circuit.

6. The power safety circuit as claimed in claim 1, wherein said output driver unit comprises a dedicated low power circuit arranged to drive said output terminal when receiving said second power from said power sense terminal.

7. The power safety circuit as claimed in claim 1, wherein said power detection unit is arranged to control a provision of said second power by said power sense terminal.

8. The power safety circuit as claimed in claim 1, wherein said output terminal is connected to a control unit arranged to switch a safety critical system into a safety mode depending on said state of said input terminal.

9. The power safety circuit as claimed in claim 1, wherein said output terminal is connected to a high-side switch.

10. The power safety circuit as claimed in claim 1, wherein said output terminal is a reset pin.

11. An integrated circuit device comprising:
a power source; and
at least one power safety circuit, wherein the at least one power safety circuit comprises
a power sense terminal,
an output terminal,
an output driver unit connected to said output terminal,
an input terminal connectable to receive a first power from the power source and arranged to supply said first power to said output driver unit, and
a power detection unit arranged to detect a state of said input terminal and provide a power sense signal to said power sense terminal, wherein said power sense terminal is arranged to supply a second power to said output driver unit when said power sense signal indicates that a level of said first power is below a minimum level for driving said output terminal, and wherein a level of said second power is lower than said level of said first power.

12. The integrated circuit device as claimed in claim 11, wherein said level of said first power being below said minimum level corresponds to an absence of said first power.

13. The integrated circuit device as claimed in claim 11, wherein said output terminal is a fail safe terminal.

14. The power safety circuit as claimed in claim 11, wherein said output driver unit is arranged to drive said output terminal in a fail safe state when receiving said second power.

15. The power safety circuit as claimed in claim 11, wherein said power detection unit comprises a power-on reset detection circuit.

16. The power safety circuit as claimed in claim 11, wherein said output driver unit comprises a dedicated low power circuit arranged to drive said output terminal when receiving said second power from said power sense terminal.

17. The power safety circuit as claimed in claim 11, wherein said power detection unit is arranged to control a provision of said second power by said power sense terminal.

18. A method, comprising
receiving, at an input terminal of a power safety circuit, a first power from a power source;
supplying, by the input terminal, the first power to an output driver unit of the power safety circuit;
detecting, by a power detection unit, a state of the input terminal;
providing, by a power detection unit, a power sense signal to a switching unit based on the state of the input terminal;
connecting, by the switching unit, a power sense terminal of the power safety circuit to the output driver unit in response to the power sense signal; and
supplying, by the switching unit, the second power to the output driver unit in response to an indication in said power sense signal that a level of said first power is below a minimum level for driving said output terminal, wherein a level of said second power is lower than said level of said first power.

19. The power safety circuit as claimed in claim 1, comprising a switching unit arranged to connect said power sense terminal to said output drive unit depending on said power sense signal.

* * * * *